(12) United States Patent
Kawase

(10) Patent No.: US 11,498,622 B2
(45) Date of Patent: Nov. 15, 2022

(54) VEHICLE STRUCTURE

(71) Applicants: TOYOTA JIDOSHA KABUSHIKI KAISHA, Aichi (JP); SUBARU CORPORATION, Tokyo (JP)

(72) Inventor: Kyosuke Kawase, Okazaki (JP)

(73) Assignees: TOYOTA JIDOSHA KABUSHIKI KAISHA, Aichi-Ken (JP); SUBARU CORPORATION, Tokyo (JP)

(*) Notice: Subject to any disclaimer, the term of this patent is extended or adjusted under 35 U.S.C. 154(b) by 124 days.

(21) Appl. No.: 17/147,463

(22) Filed: Jan. 13, 2021

(65) Prior Publication Data

US 2021/0237805 A1 Aug. 5, 2021

(30) Foreign Application Priority Data

Jan. 30, 2020 (JP) .............................. JP2020-013675

(51) Int. Cl.
*B60J 7/00* (2006.01)
*B62D 25/20* (2006.01)
*B60H 1/00* (2006.01)

(52) U.S. Cl.
CPC ......... *B62D 25/20* (2013.01); *B60H 1/00207* (2013.01); *B60H 2001/00221* (2013.01)

(58) Field of Classification Search
CPC .... B62D 21/11; B62D 25/2036; B62D 25/20; B62D 21/152; B62D 25/145; B60K 1/04; B60K 2001/0438
See application file for complete search history.

(56) References Cited

U.S. PATENT DOCUMENTS

| | | | |
|---|---|---|---|
| 10,933,916 B2 * | 3/2021 | Kasai | B62D 25/2027 |
| 2005/0017544 A1 * | 1/2005 | Bull | B60N 2/305 |
| | | | 296/187.08 |
| 2007/0007054 A1 * | 1/2007 | Nakashima | B60K 1/00 |
| | | | 180/65.1 |
| 2010/0090491 A1 * | 4/2010 | Hipshier | B60R 7/04 |
| | | | 296/24.34 |
| 2010/0213741 A1 * | 8/2010 | Suzuki | B62D 25/2036 |
| | | | 296/193.07 |
| 2017/0341482 A1 | 11/2017 | Takezawa | |
| 2019/0233015 A1 * | 8/2019 | Kasai | B62D 25/2018 |
| 2020/0070671 A1 * | 3/2020 | Ohkuma | B60K 1/04 |
| 2020/0282818 A1 * | 9/2020 | Hilmann | B60N 2/005 |
| 2021/0237806 A1 * | 8/2021 | Kawase | B62D 25/2018 |
| 2021/0291708 A1 * | 9/2021 | Gajda | B60N 2/62 |

FOREIGN PATENT DOCUMENTS

| | | |
|---|---|---|
| JP | 201184086 A | 4/2011 |
| JP | 201678804 A | 5/2016 |
| WO | 2016063567 A1 | 4/2016 |

* cited by examiner

*Primary Examiner* — Kiran B Patel
(74) *Attorney, Agent, or Firm* — Hauptman Ham, LLP

(57) ABSTRACT

An vehicle structure may include: a floor panel; a front crossmember disposed on the floor panel and below a front seat of a vehicle, and extending along a vehicle width direction; a rear crossmember disposed on the floor panel and rearward of the front crossmember, spaced apart from the front crossmember, and extending along the vehicle width direction; a center console disposed above the floor panel at a center of the floor panel in the vehicle width direction; and an air duct extending from the center console over the front crossmember and being open toward a position above the rear crossmember between the front seal and the floor panel.

3 Claims, 3 Drawing Sheets

VEHICLE STRUCTURE

CROSS-REFERENCE TO RELATED APPLICATION

This application claims priority to Japanese Patent Application No. 2020-013675 filed on Jan. 30, 2020, the contents of which are hereby incorporated by reference into the present application.

TECHNICAL FIELD

The art disclosed herein relates to a vehicle structure with an air duct.

BACKGROUND

International Publication No. WO 2016/063567 describes a vehicle provided with an air duct. The air duct extends through an opening penetrating through a crossmember disposed on a floor panel.

SUMMARY

In the above-described art, the crossmember has a height sufficient for having the opening through which the air duct extends. Due to this, a size of the crossmember increases, and vehicle weight increases.

The disclosure herein discloses art that does not require an increase in a size of a crossmember.

The art disclosed herein relates to a vehicle structure. The vehicle structure may comprise: a floor panel; a front crossmember disposed on the floor panel and below a front seat of a vehicle, and extending along a vehicle width direction; a rear crossmember disposed on the floor panel and rearward of the front crossmember, spaced apart from the front crossmember, and extending along the vehicle width direction; a center console disposed above the floor panel at a center of the floor panel in the vehicle width direction; and an air duct extending from the center console over the front crossmember and being open toward a position above the rear crossmember between the front seat and the floor panel.

According to this configuration, the air duct extends over the crossmember. Due to this, an opening through which the air duct extends does not need to be provided in the crossmember. Due to this, a size of the crossmember may not be increased. As a result, an increase in vehicle weight can be mitigated.

Details and further improvements to the art disclosed herein will be described in DETAILED DESCRIPTION below.

DETAILED DESCRIPTION

The air duct may comprise a curving portion curving toward a position above the rear crossmember in front of the rear crossmember and oriented rearward above the rear crossmember, and the curving portion is disposed such that the curving portion is able to be displaced downward. When a load is applied to a seat surface of a front seat located above the air duct, the seat surface may deform downward. According to the above configuration, since the curving portion is disposed so as to be displaced downward, the curving portion is displaced downward in accordance with the downward deformation of the front seat, which may avoid a situation in which the air duct comes into contact with the front seat and thereby breaks.

The rear crossmember may comprise an inclined surface inclined rearward at an upper end of the rear crossmember. According to this configuration, when a passenger is to ride rearward of the rear crossmember, the passenger may place his/her feet more easily on the inclined surface of the rear crossmember. Due to this, air may be blown out from an air outlet of the air duct toward the feet of the passenger in a rear seat.

Figure 1:
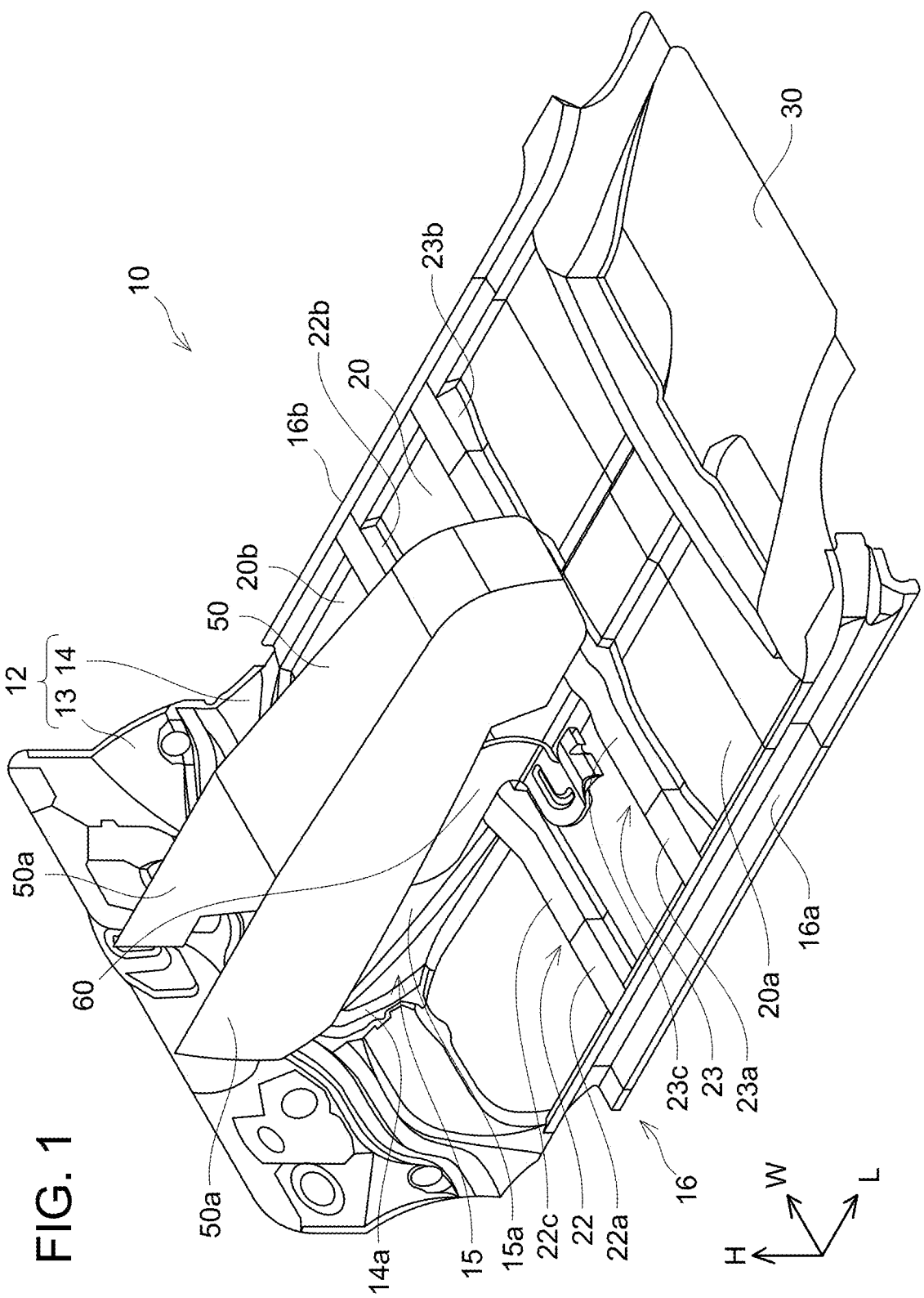
FIG. 1 is a schematic perspective view of an electric vehicle structure.

FIG. 1 is a perspective view of an electric vehicle structure 10 from above. The electric vehicle structure 10 configures front and bottom portions of a passenger compartment in which an occupant of the electric vehicle is to be seated, and a bottom portion of a luggage room located behind the passenger compartment.

The electric vehicle structure 10 includes a dash panel 12, a center tunnel 15, a pair of rockers 16, a floor panel 20, crossmembers 22, 23, and a rear member 30. In each of the drawings, positional relationships among the constituent members 12, 15, 16, 18, 20, 22, 23, 30 are suitably shown, however, mounting surfaces to which components of the electric vehicle are to be mounted, openings, beads for reinforcing the panels, and the like, are omitted.

The dash panel 12 is disposed at a front edge of the passenger compartment, and separates the passenger compartment from a front compartment where a power control unit (hereinbelow termed "PCU") and the like are disposed. The dash panel 12 includes an upper dash panel 13 and a lower dash panel 14. The upper dash panel 13 includes one or more openings communicating the front compartment with the passenger compartment. The lower dash panel 14 is disposed below the upper dash panel 13. The lower dash panel 14 is fixed to a lower end of the upper dash panel 13 by welding. The lower dash panel 14 extends from the lower end of the upper dash panel 13 to a lower end of the passenger compartment. Each of the upper dash panel 13 and the lower dash panel 14 is fabricated by processing a single plate.

At a center 14a in a vehicle width direction W, a lower end of the lower dash panel 14 is located higher than both ends thereof in the width direction W. The center tunnel 15 is disposed at the center 14a of the lower dash panel 14. The center tunnel 15 has a space defined by a tunnel outer panel of the center tunnel 15. The tunnel outer panel is attached to the center 14a at the lower end of the lower dash panel 14 by welding.

A plurality of electric cables is arranged in the center tunnel 15. Further, a plurality of pipes is also arranged in the center tunnel 15. The electric cables are cables for supplying power from the PCU disposed in the front compartment frontward of the dash panel 12 in the vehicle to a motor disposed in a rear portion of the vehicle and below the rear member 30. Coolant for cooling the motor that is disposed at the rear portion of the vehicle and below the rear member 30 flows through the pipes from a radiator disposed in the front compartment frontward of the dash panel 12 in the vehicle. On the other hand, an exhaust pipe such as those in a vehicle in which an engine is mounted is not disposed in the center tunnel 15. Due to this, a height of the center tunnel 15 can be set low.

The floor panel 20 is disposed on both sides of the center tunnel 15 in the width direction W. The floor panel 20 configures a front portion of a floor surface of the passenger compartment. The floor panel 20 is divided into left and right floor portions 20a, 20b. A front end of the left floor portion 20a is connected to the lower end of the lower dash panel 14 and a right end of the left floor portion 20a is connected to the tunnel outer panel of the center tunnel 15. A front end of the right floor portion 20b is connected to the lower end of the lower dash panel 14 and a left end of the right floor portion 20b is connected to the tunnel outer panel of the center tunnel 15. As a result, the center tunnel 15 projects upward from the floor panel 20 and has an uplifted shape.

The pair of rockers 16 are respectively disposed on ends of the floor panel 20 in the width direction W. A left rocker 16a is disposed on a left end of the left floor portion 20a. The left rocker 16a is fixed to the left end of the left floor portion 20a by welding. Similarly, a right rocker 16b is disposed on a right end of the right floor portion 20b. The right rocker 16b is fixed to the right end of the right floor portion 20b by welding. A vehicle outer panel that is omitted in the drawings is disposed outside of each of the pair of rockers 16 in the vehicle width direction (i.e., the width direction W).

Front ends of the pair of rockers 16 are respectively extend to positions where ends of the lower dash panel 14 in the width direction W are joined to the floor panel 20. Rear ends of the pair of rockers 16 extend beyond a rear end of the floor panel 20.

The two crossmembers 22, 23 are disposed between the pair of rockers 16. The two crossmembers 22, 23 are mounted on the floor panel 20 and the tunnel outer panel of the center tunnel 15 and spaced apart from each other in the front-rear direction L. In a variant, the number of the crossmembers 22, 23 is not limited, and may be one or three or more. Each of the crossmembers 22, 23 is connected to the pair of rockers 16. Due to this, each of the crossmembers 22, 23 is disposed linearly and continuously from the left rocker 16a to the right rocker 16b. A driver's seat disposed in the passenger compartment and a passenger seat disposed next to the driver's seat are attached to the crossmembers 22, 23 via fixing members that are mounted on the crossmembers 22, 23 and project in a height direction H.

The crossmember 22 includes member ends 22a, 22b respectively located at ends of the crossmember 22 in the width direction W and a member body 22c extending between the member ends 22a, 22b. Each of this pair of member ends 22a, 22b is fixed to its corresponding one of the pair of rockers 16 by welding. The member end 22a extends on the floor panel 20 from the left rocker 16a to which the member end 22a is fixed along the width direction W. The member end 22b extends on the floor panel 20 from the right rocker 16b to which the member end 22b is fixed along the width direction W. The member ends 22a, 22b are mounted on the floor panel 20 and are fixed to the floor panel 20 by welding.

The member body 22c is disposed between the pair of member ends 22a, 22b. The member body 22c is in a space defined by the pair of member ends 22a, 22b and the floor panel 20, and is fixed to each of the member ends 22a, 22b by welding. The member body 22c is disposed to extend on side panels 15a and an upper panel of the tunnel outer panel of the center tunnel 15. The member body 22c is fixed to the upper panel and the side panels 15a by welding. Portions of the member body 22c other than its portion fixed to the center tunnel 15 are fixed to the floor panel 20 by welding. A length of the member body 22c in the height direction H is constant over its entire length in the width direction W.

Due to this, the portion of the member body 22c extending on the center tunnel 15 is located higher than its portions mounted on the floor panel 20.

The crossmember 23 is disposed rearward of the crossmember 22 and extends on the upper panel of the center tunnel 15 similar to the crossmember 22. Similar to the crossmember 22, the crossmember 23 includes member ends 23a, 23b respectively located at ends of the crossmember 23 in the width direction W and a member body 23c extending between the pair of member ends 23a, 23b. The member end 23b has a similar configuration to that of the member end 22b. The member body 23c has a similar configuration to that of the member body 22c.

A center console 50 is disposed above the center tunnel 15 and spaced apart from the center tunnel 15. The center console 50 is disposed at a center in the width direction W and between the driver's seat and the passenger seat next to the driver's seat. Although not shown, the center console 50 has an operation unit for operating a car navigation system, a housing for housing passenger belongings disposed therein, and the like. The center console 50 covers the dash panel 12, and is connected to a dashboard (not shown) disposed at a front end of the passenger compartment.

Figure 2:
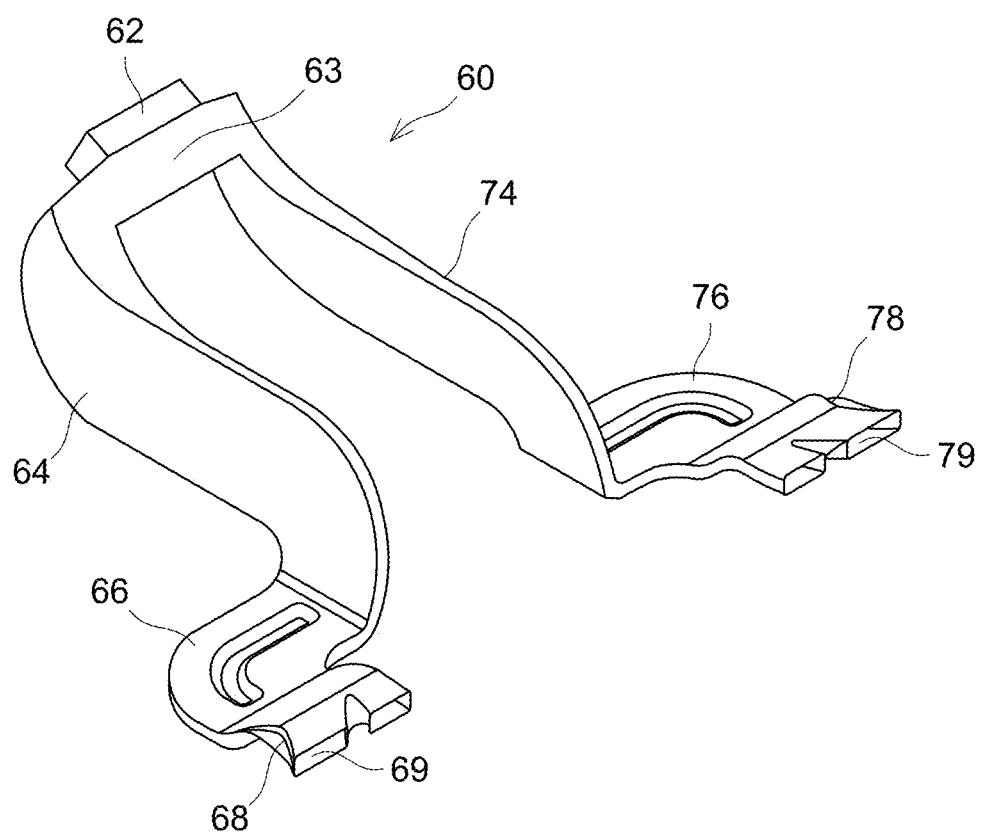
FIG. 2 is a perspective view of an air duct.

An air duct 60 is further disposed above the center tunnel 15. As shown in FIG. 2, the air duct 60 branches to left and right sides in the width direction W. The air duct 60 has a symmetric shape with respect to the center in the width direction W. The air duct 60 has a hollow pipe shape. The air duct 60 includes an air inlet 62, a branching portion 63, passage portions 64, 66, 74, 76, curving portions 68, 78, and air outlets 69, 79.

The air inlet 62 includes an opening communicating with an air feeding device (not shown) disposed on the center tunnel 15. The air inlet 62 communicates with the branching portion 63. The air inlet 62 and the branching portion 63 are disposed on the center tunnel 15. The branching portion 63 branches to the right and left sides in the width direction W from the air inlet 62 and extends. The air inlet 62 and the branching portion 63 are disposed on the center tunnel 15 and are housed in the center console 50.

Figure 3:
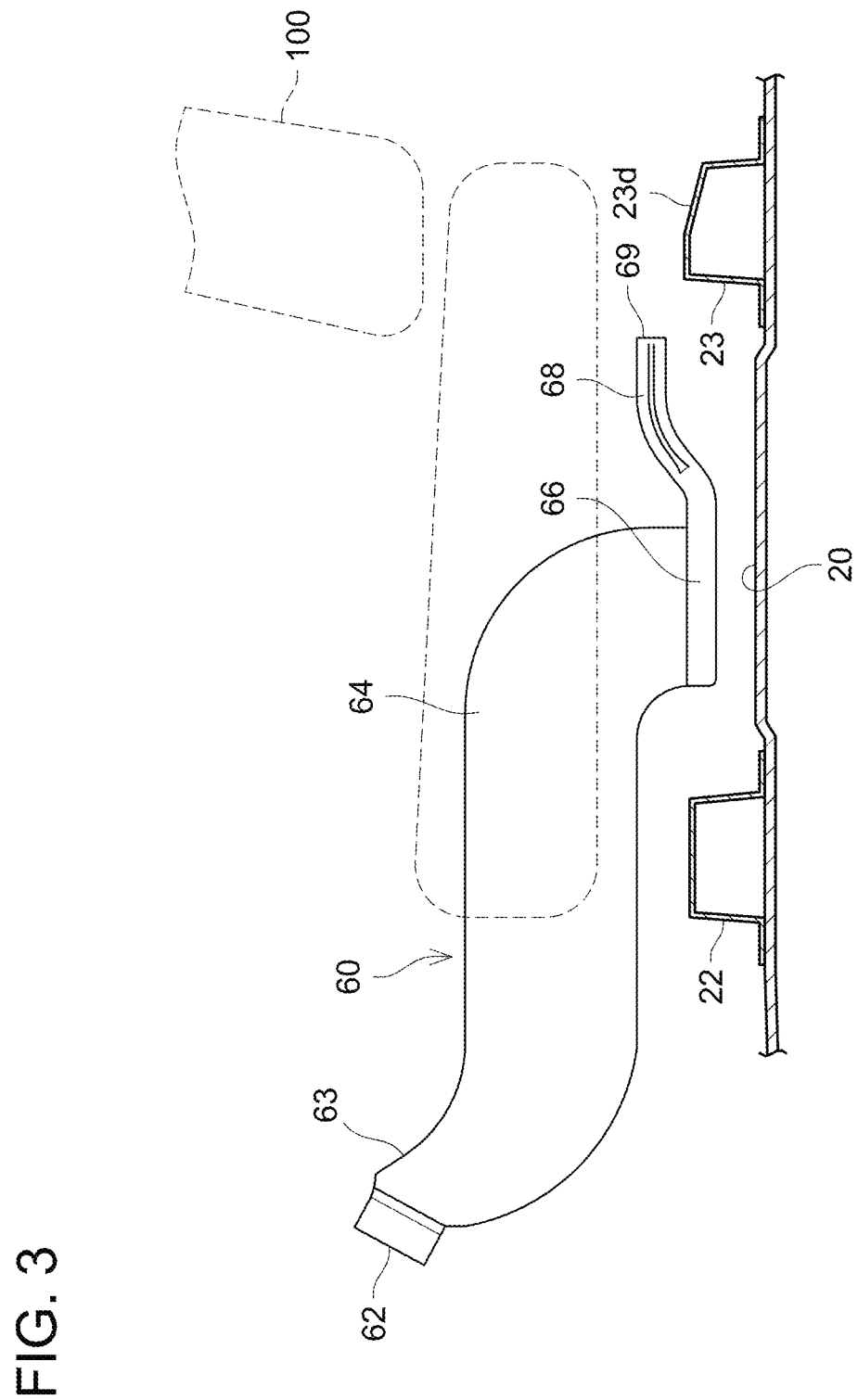
FIG. 3 is a right side view of the air duct.

The passage portion 64 communicates with a left end of the branching portion 63. The passage portion 64 has a flat shape disposed in an interval between one of the side panels 15a of the center tunnel 15 and one of side panels 50a of the center console 50. The passage portion 64 extends rearward from the branching portion 63. FIG. 3 shows a side view of the air duct 60. FIG. 3 shows the crossmembers 22, 23 in a cross section parallel to the height direction H and the front-rear direction L located at a right end of the air duct 60, a cross section of the floor panel 20, and the front seat 100. As shown in FIG. 3, the passage portion 64 extends over the crossmember 22, curved downward, and extends to a position between the crossmember 22 and the crossmember 23. As shown in FIG. 2, the passage portion 66 communicates with a rear end of the passage portion 64. The passage portion 66 extends outward in the width direction W (that is, leftward) from the passage portion 64 and curves rearward at its intermediate position. As shown in FIG. 3, a height of the passage portion 66 is constant between the crossmember 22 and the crossmember 23.

The curving portion 68 communicates with a rear end of the passage portion 66. The curving portion 68 curves from the rear end of the passage portion 66 toward a position above a height of the crossmember 23, and oriented rearward therebehind. A rear end of the curving portion 68 is oriented rearward. The air outlet 69 is disposed at the rear end of the curving portion 68. The air outlet 69 is open toward a position above the crossmember 23. Feet of a passenger on a rear seat are to be placed on a top surface 23d of the crossmember 23. Due to this, warm air can be blown out from the air outlet 69 of the air duct 60 toward the feet of the passenger in the rear seat. The top surface 23d of the crossmember 23 is inclined rearward. Due to this, the passenger can easily place his/her feet thereon.

The passage portion 74 having a similar configuration as the passage portion 64 communicates with a right end of the branching portion 63. The passage portion 76, the curving portion 78, and the air outlet 79 are disposed symmetrical to the passage portion 66, the curving portion 68, and the air outlet 69 with respect to the center in the width direction W and have similar configurations, respectively.

The rear member 30 is disposed at the rear end of the floor panel 20. The rear member 30 configures a rear portion of the passenger compartment and the bottom portion of the luggage room disposed behind the passenger compartment. The rear member 30 is configured by a plurality of panels such as a rear floor panel being connected to each other.

According to this configuration, the air duct 60 extends over the crossmember 22, thus an opening through which the air duct extends does not need to be provided in the crossmember 22. Due to this, a size of the crossmember 22 may not be increased. As a result, an increase in the vehicle weight can also be mitigated.

The passage portions 66, 76 and the curving portions 68, 78 of the air duct 60 are located below the front seat 100. The curving portions 68, 78 of the air duct 60 may be under a risk of being pressed by a seat surface when a load is applied to the seat surface of the front seat 100 and the seat surface thereby deforms downward. The air duct 60 is configured elastically deformable such that the curving portions 68, 78 are displaced downward. Due to this, the air duct 60 can be prevented from breaking by coming into contact with the seat surface.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A vehicle structure comprising:
   a floor panel;
   a front crossmember disposed on the floor panel and below a front seat of a vehicle, and extending along a vehicle width direction;
   a rear crossmember disposed on the floor panel and rearward of the front crossmember, spaced apart from the front crossmember, and extending along the vehicle width direction;
   a center console disposed above the floor panel at a center of the floor panel in the vehicle width direction; and
   an air duct extending from the center console over the front crossmember and being open toward a position above the rear crossmember between the front seat and the floor panel.

2. The vehicle structure as in claim 1, wherein
   the air duct comprises a curving portion curving toward a position above the rear crossmember in front of the rear crossmember and oriented rearward above the rear crossmember, and
   the curving portion is disposed such that the curving portion is able to be displaced downward.

3. The vehicle structure as in claim 1, wherein the rear crossmember comprises an inclined surface inclined rearward at an upper end of the rear crossmember.

* * * * *